United States Patent
Sekiguchi et al.

(10) Patent No.: US 7,292,731 B2
(45) Date of Patent: Nov. 6, 2007

(54) IMAGE ENCODER, IMAGE DECODER, IMAGE ENCODING METHOD, AND IMAGE DECODING METHOD

(75) Inventors: Shunichi Sekiguchi, Yamato (JP); Akira Kinno, Yokohama (JP); Kazuo Sugimoto, Fujisawa (JP); Minoru Etoh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 349 days.

(21) Appl. No.: 10/362,364

(22) PCT Filed: Jun. 28, 2002

(86) PCT No.: PCT/JP02/06615

§ 371 (c)(1),
(2), (4) Date: Feb. 11, 2004

(87) PCT Pub. No.: WO03/003745

PCT Pub. Date: Jan. 9, 2003

(65) Prior Publication Data

US 2004/0131268 A1    Jul. 8, 2004

(30) Foreign Application Priority Data

Jun. 29, 2001  (JP) .............................. 2001-199008

(51) Int. Cl.
*G06K 9/36* (2006.01)
*G06K 9/46* (2006.01)

(52) U.S. Cl. ...................... 382/238; 382/236; 382/246; 382/233; 375/240.24

(58) Field of Classification Search ................ 382/228, 382/232, 233, 236, 237, 238, 239, 244, 245, 382/246, 248, 250, 251, 252, 253; 375/240.24; 358/426.01, 426.16; 341/65, 67
See application file for complete search history.

(56) References Cited

U.S. PATENT DOCUMENTS

| | | | | |
|---|---|---|---|---|
| 5,136,371 A | * | 8/1992 | Savatier et al. | 375/240.05 |
| 5,150,209 A | * | 9/1992 | Baker et al. | 375/240.02 |
| 5,654,702 A | * | 8/1997 | Ran | 341/51 |
| 5,959,675 A | * | 9/1999 | Mita et al. | 375/240.04 |

(Continued)

FOREIGN PATENT DOCUMENTS

| | | |
|---|---|---|
| JP | 9-331535 | 12/1997 |
| JP | 11-220728 | 8/1999 |
| JP | 2001-103315 | 4/2001 |

OTHER PUBLICATIONS

Mark Nelson, et al., "The Data Compression Book, 2nd Edition", M&T Books, Chapter 5, 1995, pp. 114-122.

(Continued)

*Primary Examiner*—Matthew C. Bella
*Assistant Examiner*—Ali Bayat
(74) *Attorney, Agent, or Firm*—Oblon, Spivak, McClelland, Maier & Neustadt, P.C.

(57) ABSTRACT

The image coding apparatus is constituted comprising an atom extraction section 109 for acquiring position data indicating the positions of atoms of prediction residual data in macroblocks, for each of the macroblocks; and a variable length encoding section 113 for determining the frequency of occurrence distribution of the position data in the macroblocks to be encoded, in accordance with the number of atoms of prediction residual data present in the macroblocks, and for performing arithmetic coding of the position data on the basis of the frequency of occurrence distribution thus determined. An improvement in the efficiency of the entropy coding of the atom parameters of Matching Pursuits coding is therefore feasible.

12 Claims, 16 Drawing Sheets

U.S. PATENT DOCUMENTS 6,363,119 B1 * 3/2002 Oami ................ 375/240.03
6,563,953 B2 * 5/2003 Lin et al. ................ 382/233
6,614,847 B1 * 9/2003 Das et al. ............. 375/240.16

OTHER PUBLICATIONS

Didier Le Gall, "MPEG: A Video Compression Standard for Multimedia Applications", Communications of the ACM, vol. 34, No. 4, Apr. 1991, pp. 47-58.

Mohammad Gharavi-Aikhansari: "A model for entropy coding in mathcing pursuit" PROCEEDINGS, ICIP 98, vol. 1, pp. 778-782 Oct. 4, 1998-Oct. 7, 1998.

Ralph Neff et al.: "Very low bit-rate video coding based on matching pursuit" IEEE Transactions on Circuits and Systems for Video Technology, vol. 7, No. 1, pp. 158-171 Feb. 1997.

* cited by examiner

Fig.3A MC MODE1

| 0 |
|---|

Fig.3B MC MODE2

| 0 |
|---|
| 1 |

Fig.3C MC MODE3

| 0 | 1 |

Fig.3D MC MODE4

| 0 | 1 |
|---|---|
| 2 | 3 |

Fig.3E MC MODE5

| 0 | 1 | 2 | 3 |
|---|---|---|---|
| 4 | 5 | 6 | 7 |

Fig.3F MC MODE6

| 0 | 1 |
|---|---|
| 2 | 3 |
| 4 | 5 |
| 6 | 7 |

Fig.3G MC MODE7

| 0 | 1 | 2 | 3 |
|---|---|---|---|
| 4 | 5 | 6 | 7 |
| 8 | 9 | 10 | 11 |
| 12 | 13 | 14 | 15 |

MB

AT

ATOM DETECTION ORDER K

Fig.13

| CODING MODE DATA | | BINARY PATTERN | | | | |
|---|---|---|---|---|---|---|
| 1 | SKIP | 0 | | | | |
| 2 | MODE1, WITHOUT ATOM | 1 | 0 | 0 | 0 | 0 |
| 3 | MODE2, WITHOUT ATOM | 1 | 0 | 0 | 0 | 1 |
| 4 | MODE3, WITHOUT ATOM | 1 | 0 | 0 | 1 | 0 |
| 5 | MODE4, WITHOUT ATOM | 1 | 0 | 0 | 1 | 1 |
| 6 | MODE5, WITHOUT ATOM | 1 | 0 | 1 | 0 | 0 |
| 7 | MODE6, WITHOUT ATOM | 1 | 0 | 1 | 0 | 1 |
| 8 | MODE7, WITHOUT ATOM | 1 | 0 | 1 | 1 | 0 |
| 9 | INTRA, WITHOUT ATOM | 1 | 0 | 1 | 1 | 1 |
| 10 | MODE1, WITH ATOM | 1 | 1 | 0 | 0 | 0 |
| 11 | MODE2, WITH ATOM | 1 | 1 | 0 | 0 | 1 |
| 12 | MODE3, WITH ATOM | 1 | 1 | 0 | 1 | 0 |
| 13 | MODE4, WITH ATOM | 1 | 1 | 0 | 1 | 1 |
| 14 | MODE5, WITH ATOM | 1 | 1 | 1 | 0 | 0 |
| 15 | MODE6, WITH ATOM | 1 | 1 | 1 | 0 | 1 |
| 16 | MODE7, WITH ATOM | 1 | 1 | 1 | 1 | 0 |
| 17 | INTRA, WITH ATOM | 1 | 1 | 1 | 1 | 1 |
| BIT POSITION FOLLOWING BINARIZATION | | 1 | 2 | 3 | 4 | 5 |

Fig.14

| CONTEXT VALUE (CM1) | FREQUENCY OF OCCURRENCE TABLE | |
|---|---|---|
| | 0 | 1 |
| 0 | 0.9 | 0.1 |
| 1 | 0.6 | 0.4 |
| 2 | 0.6 | 0.4 |
| 3 | 0.1 | 0.9 |

Fig.15

| CONTEXT VALUE (CM2) | FREQUENCY OF OCCURRENCE TABLE | |
|---|---|---|
| | 0 | 1 |
| 0 | 0.8 | 0.2 |
| 1 | 0.5 | 0.5 |
| 2 | 0.5 | 0.5 |
| 3 | 0.2 | 0.8 |

Fig.16

| ATOM POSITION DATA | BINARY PATTERN | | | | | | | |
|---|---|---|---|---|---|---|---|---|
| 0 | 0 | | | | | | | |
| 1 | 0 | 0 | | | | | | |
| 2 | 0 | 1 | 0 | | | | | |
| 3 | 0 | 1 | 1 | | | | | |
| 4 | 1 | 0 | 0 | | | | | |
| 5 | 1 | 0 | 1 | | | | | |
| 6 | 1 | 1 | 0 | 0 | 0 | | | |
| 7 | 1 | 1 | 0 | 0 | 1 | | | |
| 8 | 1 | 1 | 0 | 1 | 0 | | | |
| 9 | 1 | 1 | 0 | 1 | 1 | | | |
| 10 | 1 | 1 | 1 | 0 | 0 | 0 | 0 | |
| 11 | 1 | 1 | 1 | 0 | 0 | 0 | 1 | |
| 12 | 1 | 1 | 1 | 0 | 0 | 1 | 0 | |
| 13 | 1 | 1 | 1 | 0 | 0 | 1 | 1 | |
| 14 | 1 | 1 | 1 | 0 | 1 | 0 | 0 | |
| : | : | : | : | : | : | : | : | : |
| BIT POSITION FOLLOWING BINARIZATION | 1 | 2 | 3 | 4 | 5 | 6 | 7 | ·· |

Fig.17

| CONTEXT VALUE (CM3) | FREQUENCY OF OCCURRENCE TABLE | |
|---|---|---|
| | 0 | 1 |
| 0 | 0.2 | 0.8 |
| 1 | 0.4 | 0.6 |
| 2 | 0.6 | 0.4 |
| 3 | 0.8 | 0.2 |

Fig.18

| BASIS INDEX | BINARY PATTERN | | | | | | |
|---|---|---|---|---|---|---|---|
| 0 | 0 | | | | | | |
| 1 | 0 | 0 | | | | | |
| 2 | 0 | 1 | 0 | | | | |
| 3 | 0 | 1 | 1 | | | | |
| 4 | 1 | 0 | 0 | | | | |
| 5 | 1 | 0 | 1 | | | | |
| 6 | 1 | 1 | 0 | 0 | 0 | | |
| 7 | 1 | 1 | 0 | 0 | 1 | | |
| 8 | 1 | 1 | 0 | 1 | 0 | | |
| 9 | 1 | 1 | 0 | 1 | 1 | | |
| 10 | 1 | 1 | 1 | 0 | 0 | 0 | 0 |
| 11 | 1 | 1 | 1 | 0 | 0 | 0 | 1 |
| 12 | 1 | 1 | 1 | 0 | 0 | 1 | 0 |
| 13 | 1 | 1 | 1 | 0 | 0 | 1 | 1 |
| 14 | 1 | 1 | 1 | 0 | 1 | 0 | 0 |
| : | : | : | : | : | : | : | : |
| BIT POSITION FOLLOWING BINARIZATION | 1 | 2 | 3 | 4 | 5 | 6 | 7 ·· |

Fig.19

| CONTEXT VALUE (CM4) | FREQUENCY OF OCCURRENCE TABLE | |
|---|---|---|
| | 0 | 1 |
| 0 | 0.8 | 0.2 |
| 1 | 0.6 | 0.4 |
| 2 | 0.4 | 0.6 |
| 3 | 0.2 | 0.8 |

Fig.20

| ATOM NUMBER IN MACROBLOCK | BINARY PATTERN | | | | | | |
|---|---|---|---|---|---|---|---|
| 1 | 0 | 0 | | | | | |
| 2 | 0 | 1 | | | | | |
| 3 | 1 | 0 | 0 | | | | |
| 4 | 1 | 0 | 1 | 0 | | | |
| 5 | 1 | 0 | 1 | 1 | | | |
| 6 | 1 | 1 | 0 | 0 | 0 | | |
| 7 | 1 | 1 | 0 | 0 | 1 | | |
| 8 | 1 | 1 | 0 | 1 | 0 | | |
| 9 | 1 | 1 | 0 | 1 | 1 | | |
| 10 | 1 | 1 | 1 | 0 | 0 | 0 | 0 |
| 11 | 1 | 1 | 1 | 0 | 0 | 0 | 1 |
| 12 | 1 | 1 | 1 | 0 | 0 | 1 | 0 |
| 13 | 1 | 1 | 1 | 0 | 0 | 1 | 1 |
| 14 | 1 | 1 | 1 | 0 | 1 | 0 | 0 |
| : | : | : | : | : | : | : | : |
| BIT POSITION FOLLOWING BINARIZATION | 1 | 2 | 3 | 4 | 5 | 6 | 7 ·· |

Fig.21

| CONTEXT VALUE (CM5) | FREQUENCY OF OCCURRENCE TABLE | |
|---|---|---|
| | 0 | 1 |
| 0 | 0.8 | 0.2 |
| 1 | 0.6 | 0.4 |
| 2 | 0.4 | 0.6 |
| 3 | 0.2 | 0.8 |

Fig.22

| CONTEXT VALUE (CM6) | FREQUENCY OF OCCURRENCE TABLE | |
|---|---|---|
| | 0 | 1 |
| 0 | 0.8 | 0.2 |
| 1 | 0.4 | 0.6 |

Fig.24

| ATOM COEFFICIENT DATA | BINARY PATTERN | | | | | | | |
|---|---|---|---|---|---|---|---|---|
| 0 | 0 | | | | | | | |
| 1 | 0 | 0 | | | | | | |
| 2 | 0 | 1 | 0 | | | | | |
| 3 | 0 | 1 | 1 | | | | | |
| 4 | 1 | 0 | 0 | | | | | |
| 5 | 1 | 0 | 1 | | | | | |
| 6 | 1 | 1 | 0 | 0 | 0 | | | |
| 7 | 1 | 1 | 0 | 0 | 1 | | | |
| 8 | 1 | 1 | 0 | 1 | 0 | | | |
| 9 | 1 | 1 | 0 | 1 | 1 | | | |
| 10 | 1 | 1 | 1 | 0 | 0 | 0 | 0 | |
| 11 | 1 | 1 | 1 | 0 | 0 | 0 | 1 | |
| 12 | 1 | 1 | 1 | 0 | 0 | 1 | 0 | |
| 13 | 1 | 1 | 1 | 0 | 0 | 1 | 1 | |
| 14 | 1 | 1 | 1 | 0 | 1 | 0 | 0 | |
| : | : | : | : | : | : | : | : | : |
| BIT POSITION FOLLOWING BINARIZATION | 1 | 2 | 3 | 4 | 5 | 6 | 7 | ·· |

Fig.25

| CONTEXT VALUE (CM7) | FREQUENCY OF OCCURRENCE TABLE | | | | | |
|---|---|---|---|---|---|---|
| | ACT=0 | | ACT=1 | | ACT=2 | |
| | 0 | 1 | 0 | 1 | 0 | 1 |
| 0 | 0.1 | 0.9 | 0.1 | 0.9 | 0.1 | 0.9 |
| 1 | 0.7 | 0.3 | 0.6 | 0.4 | 0.5 | 0.5 |
| 2 | 0.9 | 0.1 | 0.8 | 0.2 | 0.7 | 0.3 |

IMAGE ENCODER, IMAGE DECODER, IMAGE ENCODING METHOD, AND IMAGE DECODING METHOD

TECHNICAL FIELD

The present invention relates to an image coding apparatus, an image decoding apparatus, an image coding method, and an image decoding method that permit the transmission and storage of images with a small encoded volume.

BACKGROUND ART

Standard moving image coding systems such as ITU-T H. 26x and the MPEG series are known from the prior art. In these standard moving image coding systems, from the viewpoint of the balance between compression efficiency and load, and indeed of the popularization of dedicated LSI, the Discrete cosine transform (referred to as "DCT" hereinbelow) is mainly employed. However, due to the fact that the DCT performs basis coefficient quantization, in cases where encoding is performed at a very low bit rate, the basis, which is key as far as the representation of the original signal is concerned, cannot be restored and, as a result, there is the problem that distortion is generated. As methods for resolving such problems, Matching Pursuits-based image coding systems exist, such as that disclosed by "R. Neff et al, "Very Low Bit-rate Video Coding Based on Matching Pursuits", IEEE Trans. on CSVT, vol. 7, pp. 158-171, February 1997. Matching Pursuits is a technique for representing an interframe prediction residual signal as the linear sum of an over-complete basis set, and, because the units of the basis representation are not limited to blocks and the possibility exists of it being possible to represent an irregular signal compactly with small number of basis coefficients by means of over-complete basis patterns, Matching pursuits possesses the characteristic of obtaining an image quality that is visually superior to that obtained by DCT encoding at low rate encoding. With Matching Pursuits, a prediction residual image signal f to be encoded can be represented as per the following equation by using an over-complete basis set G prepared in advance that comprises n types of basis $g_k \in G$ ($1 \leq k \leq n$).

$$f = \left( \sum_{i=0}^{m-1} \langle S_i, g_{ki} \rangle g_{ki} \right) + r_m \quad (1)$$

Here, m is the total number of basis search steps, i is the basis search step number, and $r_i$ is the prediction residual image signal following completion of the basis search of the (i−1)th step, this signal being without further processing the prediction residual image signal for the basis search of the ith step, where $r_0$=f. Further, $s_i$ and $g_{ki}$ are the partial region and basis respectively, these being obtained by selecting, in the basis search of the ith step, a combination of s and $g_k$ such that the inner product value thereof is maximized, from optional partial regions s (partial regions in a frame) of $r_i$, as well as optional bases $g_k$ contained in the basis set G. If the basis search is performed thus, the larger the number m of basis search steps, the less energy $r_m$ possesses. This means that the greater the number of bases used in the representation of the prediction residual image signal f, the better the signal can be represented.

In each of the basis search steps, the data that is encoded is:

1) The index expressing $g_{ki}$ ($g_k$ is shared and maintained on the encoding side and the decoding side, which makes it possible to specify a basis by converting only the index data).

2) The inner product values <$s_i$, $g_{ki}$> (correspond to the basis coefficients), and 3) $s_i$ on-screen center position data $p_i$=($x_i$, $y_i$)

A set of these parameters is collectively known as an atom. By means of this image signal representation and encoding method, the number of encoded atoms is increased, that is, as the total number m of basis search steps increases, so too does the encoded volume, whereby distortion is reduced.

Meanwhile, in order to derive the superior performance of Matching Pursuits coding, it is important to efficiently entropy code the atom parameters constituting the data to be encoded. In Matching Pursuits image coding, interframe prediction residual signals are prepared in frame units, and then partial signals which are to be represented are first specified as encoding data in the frame. These partial signals may be in any position in the frame. However, for an ordinary image signal, signal locations where movement is large, that is, that have a large amount of data, may be considered to be locations where the power of the residual signal is large, and hence methods that first detect locations at which the power is maximum in a prediction residual frame as partial signals are typical. Thereupon, such partial signals are basis-represented but such position data in the intraframe must be encoded. As far as the basis representation is concerned, bases that better represent these partial signals are selected from among the bases contained in a pre-provided basis codebook, and the corresponding index, and basis coefficient (the inner product value of the partial signal and the basis) are transmitted and stored as coding data.

Regardless of whether the Matching Pursuits or DCT described above is employed, in a conventional image coding system, the coding parameters have hitherto been entropy-coded by means of Huffman coding after being subjected to signal redundancy reduction and quantization. On the other hand, Huffman coding is subject to the restriction that only integer-length code can be allocated to the symbols to be encoded. Arithmetic coding has been proposed as a means of overcoming this restriction. The principles of arithmetic coding are explained in detail in, among other works, "The Data Compression Book 2nd edition", Mark Nelson and Jean-Loup Gailly, M&T Books, 1995, for example. The respective typical frequency of occurrence in the alphabet of symbols to be encoded is allocated to an interval on a number line from 0 to 1, and when a certain symbol occurs, the interval to which the symbol belongs is first selected, then, for the next symbol, the interval to which the previous symbol belongs is considered as being from 0 to 1 and the interval to which this next symbol is to belong is selected so as to lie within this interval. Repetition of this operation makes it possible to represent a series of symbols having a finite length in the form of a single numeric value between 0 and 1. It is known from this fact that arithmetic coding is capable of representing the code length for each symbol with decimal precision and that entropy coding efficiency is thus generally superior to Huffman coding.

DISCLOSURE OF THE INVENTION

Examples in which arithmetic coding techniques are introduced to image coding include Syntax-based Arithmetic Coding mode (referred to as "SAC" hereinbelow) which is adopted in ITU-T H. 263 image coding system Annex E. SAC provides each coding data item in H. 263 with an individual fixed frequency of occurrence table and performs arithmetic coding based on such tables. Therefore, no consideration is paid to cases where the probability of generation of certain coding data is influenced by the generation conditions of other coding data, nor to cases in which, when an image frame is encoded using region units such as fixed blocks, certain coding data in the blocks is influenced by the generation conditions of the same coding data of the neighboring blocks. As a result, the efficiency of the arithmetic coding cannot be adequately produced, particularly for a signal having temporal and spatial dependence as for an image.

According to the conventional Matching Pursuits coding system as illustrated by the above paper, a technique of fixedly allocating Huffman codes based on the frequencies of occurrence of discrete data is adopted in the entropy coding of atom parameters, as is the case for many other standard image coding systems. However, it is an object of the present invention to improve the entropy coding efficiency of Matching Pursuits coding atom parameters through the introduction of arithmetic coding. In order to improve the efficiency of arithmetic coding, it is a further object of this invention to improve the entropy coding efficiency of atom parameters by directing attention toward the interdependence of the atom parameters in Matching Pursuits coding, defining context models on the basis of conditional probabilities, and switching the frequency of occurrence table according to the context.

In order to resolve the above problems, the image coding apparatus according to the present invention is characterized by comprising: position data acquiring means for acquiring position data indicating the positions of unit elements of prediction residual data in predetermined partial image regions, for each of the partial image regions; context determining means for determining the frequency of occurrence distribution of the position data in the partial image regions to be encoded, in accordance with the number of unit elements of prediction residual data which are present in the partial image regions; and reversible encoding means for performing arithmetic coding of the position data on the basis of the determined frequency of occurrence distribution.

Further, the image decoding apparatus which corresponds to the above image coding apparatus is characterized by comprising: reversible decoding means for decoding position data indicating the positions of unit elements of prediction residual data in predetermined partial image regions, for each of the partial image regions; context determining means for determining the frequency of occurrence distribution of the position data in the partial image regions to be decoded, in accordance with the number of unit elements of prediction residual data which are present in the partial image regions; and arithmetic decoding means for performing arithmetic decoding of the position data on the basis of the determined frequency of occurrence distribution.

In addition, in order to resolve the above problems, the image coding method according to the present invention is characterized by comprising: a position data acquiring step of acquiring position data indicating the positions of unit elements of prediction residual data in predetermined partial image regions, for each of the partial image regions; a context determining step of determining the frequency of occurrence distribution of the position data in the partial image regions to be encoded, in accordance with the number of unit elements of prediction residual data which are present in the partial image regions; and a reversible encoding step of performing arithmetic coding of the position data on the basis of the determined frequency of occurrence distribution.

Further, The image decoding method which corresponds to the above image coding method is characterized by comprising: a reversible decoding step of decoding position data indicating the positions of unit elements of prediction residual data in predetermined partial image regions, for each of the partial image regions; a context determining step of determining the frequency of occurrence distribution of the position data in the partial image regions to be decoded, in accordance with the number of unit elements of prediction residual data which are present in the partial image regions; and an arithmetic decoding step of performing arithmetic decoding of the position data on the basis of the determined frequency of occurrence distribution.

The distribution of the values of position data (the difference from a certain atom position to another atom position, for example) is largely dependent on the number of the unit elements (atoms) of the prediction residual data which are present in partial image regions. Therefore, by determining the frequency of occurrence distribution of the position data in partial image regions to be encoded, in accordance with the number of unit elements of prediction residual data which are present in partial image regions, and then performing arithmetic coding of position data on the basis of the frequency of occurrence distribution thus determined, the efficiency of the entropy coding of the position data can be improved.

Furthermore, in order to resolve the above problems, the image coding apparatus according to the present invention is characterized by comprising: prediction residual distribution classifying means for classifying the prediction residual data distribution in predetermined partial image regions to acquire class data for each of the partial image regions; context determining means for determining the frequency of occurrence distribution of basis coefficient data used in the representation of unit elements of prediction residual data in the partial image regions, on the basis of the partial image region class data; and reversible encoding means for performing arithmetic coding of the basis coefficient data on the basis of the determined frequency of occurrence distribution.

Further, the image decoding apparatus which corresponds to the above image coding apparatus is characterized by comprising: reversible decoding means for decoding class data of prediction residual data distribution in predetermined partial image regions, and basis coefficient data used in the representation of unit elements of prediction residual data in the partial image regions; context determining means for determining the frequency of occurrence distribution of basis coefficient data used in the representation of unit elements of prediction residual data in the partial image regions on the basis of the class data; and arithmetic decoding means for performing arithmetic decoding of the basis coefficient data on the basis of the determined frequency of occurrence distribution.

In addition, in order to resolve the above problems, the image coding method according to the present invention is characterized by comprising: a prediction residual distribution classifying step of classifying the prediction residual data distribution in predetermined partial image regions to acquire class data for each of the partial image regions; a context determining step of determining the frequency of occurrence distribution of basis coefficient data used in the representation of unit elements of prediction residual data in the partial image regions, on the basis of the partial image region class data; and a reversible encoding step of performing arithmetic coding of the basis coefficient data on the basis of the determined frequency of occurrence distribution.

Further, the image decoding method which corresponds to the above image coding method is characterized by comprising: a reversible decoding step of decoding class data of prediction residual data distribution in predetermined partial image regions, and basis coefficient data used in the representation of unit elements of prediction residual data in the partial image regions; a context determining step of determining the frequency of occurrence distribution of basis coefficient data used in the representation of unit elements of prediction residual data in the partial image regions on the basis of the class data; and an arithmetic decoding step of performing arithmetic decoding of the basis coefficient data on the basis of the determined frequency of occurrence distribution.

The prediction residual data distribution is often divided into a few classes (groups) by using specified feature vector (value). The efficiency of the entropy coding of converted basis data is improved by determining the frequency of occurrence distribution of basis coefficient data on the basis of the class data, and then performing arithmetic coding of basis coefficient data on the basis of the frequency of occurrence distribution thus determined.

Further, in order to resolve the above problems, the image coding apparatus according to the present invention is characterized by comprising: numeric data acquiring means for acquiring numeric data indicating the number of unit elements of prediction residual data in predetermined partial image regions, for each of the partial image regions; context determining means for determining the frequency of occurrence distribution of the numeric data of the partial image regions to be encoded, in accordance with the numeric data in partial image regions neighboring the partial image regions to be encoded; and reversible encoding means for performing arithmetic coding of the numeric data on the basis of the determined frequency of occurrence distribution.

Further, the image decoding apparatus which corresponds to the above image coding apparatus is characterized by comprising: reversible decoding means for decoding numeric data indicating the number of unit elements of prediction residual data in predetermined partial image regions, for each of the partial image regions; context determining means for determining the frequency of occurrence distribution of the numeric data of the partial image regions to be decoded in accordance with the numeric data in partial image regions neighboring the partial image regions to be decoded; and arithmetic decoding means for performing arithmetic decoding of the numeric data on the basis of the determined frequency of occurrence distribution.

In addition, in order to resolve the above problems, the image coding method according to the present invention is characterized by comprising: a numeric data acquiring step of acquiring numeric data indicating the number of unit elements of prediction residual data in predetermined partial image regions, for each of the partial image regions; a context determining step of determining the frequency of occurrence distribution of the numeric data of the partial image regions to be encoded, in accordance with the numeric data in partial image regions neighboring the partial image regions to be encoded; and a reversible encoding step of performing arithmetic coding of the numeric data on the basis of the determined frequency of occurrence distribution.

Further, the image decoding method which corresponds to the above image coding method is characterized by comprising: a reversible decoding step of decoding numeric data indicating the number of unit elements of prediction residual data in predetermined partial image regions, for each of the partial image regions; a context determining step of determining the frequency of occurrence distribution of the numeric data of the partial image regions to be decoded in accordance with the numeric data in partial image regions neighboring the partial image regions to be decoded; and an arithmetic decoding step of performing arithmetic decoding of the numeric data on the basis of the determined frequency of occurrence distribution.

The number of unit elements (atoms) of prediction residual data in predetermined partial image regions is largely dependent on the number of unit elements (atoms) of the prediction residual data in partial image regions which neighbor these partial image regions. Therefore, by determining the frequency of occurrence distribution of the numeric data of the predetermined partial image regions to be encoded, in accordance with the numeric data of the unit elements (atoms) in neighboring partial image regions, and then performing arithmetic coding of numeric data on the basis of the frequency of occurrence distribution thus determined, the efficiency of the entropy coding of the numeric data can be improved.

Further, in order to resolve the above problems, the image coding apparatus according to the present invention is characterized by comprising: numeric data acquiring means for acquiring numeric data indicating the number of unit elements of prediction residual data in predetermined partial image regions, for each of the partial image regions; motion estimation means for estimating image motion data of partial image regions to be encoded; context determining means for determining the frequency of occurrence distribution of the numeric data of the partial image regions to be encoded, in accordance with image motion data in partial image regions to be encoded; and reversible encoding means for performing arithmetic coding of the numeric data on the basis of the determined frequency of occurrence distribution.

Further, the image decoding apparatus which corresponds to the above image coding apparatus is characterized by comprising: reversible decoding means for decoding numeric data indicating the number of unit elements of prediction residual data in predetermined partial image regions, for each of the partial image regions; reversible decoding means for decoding image motion data in partial image regions to be decoded, for each of the partial image regions; context determining means for determining the frequency of occurrence distribution of the numeric data of the partial image regions to be decoded in accordance with image motion data in the partial image regions; and arithmetic decoding means for performing arithmetic decoding of the numeric data on the basis of the determined frequency of occurrence distribution.

In addition, in order to resolve the above problems, the image coding method according to the present invention is characterized by comprising: a numeric data acquiring step of acquiring numeric data indicating the number of unit elements of prediction residual data in predetermined partial image regions, for each of the partial image regions; a motion estimation step of estimating image motion data of partial image regions to be encoded; a context determining step of determining the frequency of occurrence distribution of the numeric data of the partial image regions to be encoded, in accordance with image motion data in partial image regions to be encoded; and a reversible encoding step of performing arithmetic coding of the numeric data on the basis of the determined frequency of occurrence distribution.

Further, the image decoding method which corresponds to the above image coding method is characterized by comprising: a reversible decoding step of decoding numeric data indicating the number of unit elements of prediction residual data in predetermined partial image regions, for each of the partial image regions; a reversible decoding step of decoding image motion data in partial image regions to be decoded, for each of the partial image regions; a context determining step of determining the frequency of occurrence distribution of the numeric data of the partial image regions to be decoded in accordance with image motion data in the partial image regions; and an arithmetic decoding step of performing arithmetic decoding of the numeric data on the basis of the determined frequency of occurrence distribution.

The number of unit elements of prediction residual data in predetermined partial image regions is largely dependent on the image motion data in these predetermined partial image regions. Therefore, by determining the frequency of occurrence distribution of the numeric data of the unit elements in the partial image regions to be encoded, in accordance with image motion data in partial image regions to be encoded, and then performing arithmetic coding of numeric data on the basis of the frequency of occurrence distribution thus determined, the efficiency of the entropy coding of the numeric data can be improved.

In addition, in order to resolve the above problems, the image coding apparatus according to the present invention is characterized by comprising: coefficient data acquiring means for acquiring basis coefficient data used in the representation of unit elements of prediction residual data in predetermined partial image regions, for each of the unit elements; context determining means for determining the frequency of occurrence distribution of the basis coefficient data of partial image regions to be encoded in accordance with the detection order of prediction residual data in partial image regions to be encoded; and reversible encoding means for performing arithmetic coding of the basis coefficient data on the basis of the determined frequency of occurrence distribution.

Further, the image decoding apparatus which corresponds to the above image coding apparatus is characterized by comprising: context determining means for determining the frequency of occurrence distribution of the basis coefficient data of the partial image regions to be decoded, in accordance with the decoding order of the basis coefficient data used in the representation of the unit elements of prediction residual data in predetermined partial image regions; and arithmetic decoding means for performing arithmetic decoding of the basis coefficient data on the basis of the determined frequency of occurrence distribution.

In addition, in order to resolve the above problems, the image coding method according to the present invention is characterized by comprising: a coefficient data acquiring step of acquiring basis coefficient data used in the representation of unit elements of prediction residual data in predetermined partial image regions, for each of the unit elements; a context determining step of determining the frequency of occurrence distribution of the basis coefficient data of partial image regions to be encoded in accordance with the detection order of prediction residual data in partial image regions to be encoded; and a reversible encoding step of performing arithmetic coding of the basis coefficient data on the basis of the determined frequency of occurrence distribution.

Further, the image decoding method which corresponds to the above image coding method is characterized by comprising: a context determining step of determining the frequency of occurrence distribution of the basis coefficient data of the partial image regions to be decoded, in accordance with the decoding order of the basis coefficient data used in the representation of the unit elements of prediction residual data in predetermined partial image regions; and an arithmetic decoding step of performing arithmetic decoding of the basis coefficient data on the basis of the determined frequency of occurrence distribution.

The basis coefficient data used in the representation of unit elements of prediction residual data in predetermined partial image regions is largely dependent on the detection order of prediction residual data in these predetermined partial image regions. Therefore, by determining the frequency of occurrence distribution of the basis coefficient data of the partial image regions to be encoded, in accordance with the detection order of prediction residual data in partial image regions to be encoded, and then performing arithmetic coding of basis coefficient data on the basis of the frequency of occurrence distribution thus determined, the efficiency of the entropy coding of the basis coefficient data can be improved.

BRIEF DESCRIPTION OF THE DRAWINGS

FIGS. 3A to 3G show macroblocks;

FIG. 13 shows binary patterns of coding mode data;

FIG. 14 shows a frequency of occurrence table for context CM1;

FIG. 15 shows a frequency of occurrence table for context CM2;

FIG. 16 shows binary patterns of atom position data;

FIG. 17 shows a frequency of occurrence table for context CM3;

FIG. 18 shows binary patterns of basis indices;

FIG. 19 shows a frequency of occurrence table for context CM4;

FIG. 20 shows binary patterns for numbers of atoms in a macroblock;

FIG. 21 shows a frequency of occurrence table for context CM5;

FIG. 22 shows a frequency of occurrence table for context CM6;

FIG. 24 shows binary patterns of the atom coefficient data; and

FIG. 25 shows a frequency of occurrence table for context CM7 according to the value of ACT.

BEST MODES FOR CARRYING OUT THE INVENTION

First Embodiment

The image coding apparatus and decoding apparatus according to the first embodiment have an image signal comprising an array of image frames inputted thereto and are mainly constituted by: a coding apparatus constituted by interframe motion compensation predicting means; coding mode selecting means and texture signal compression/coding means; and a decoding apparatus for decoding the image signal upon receiving compressed image data (referred to as a 'bit stream' hereinafter) generated by the coding apparatus.

Figure 1:
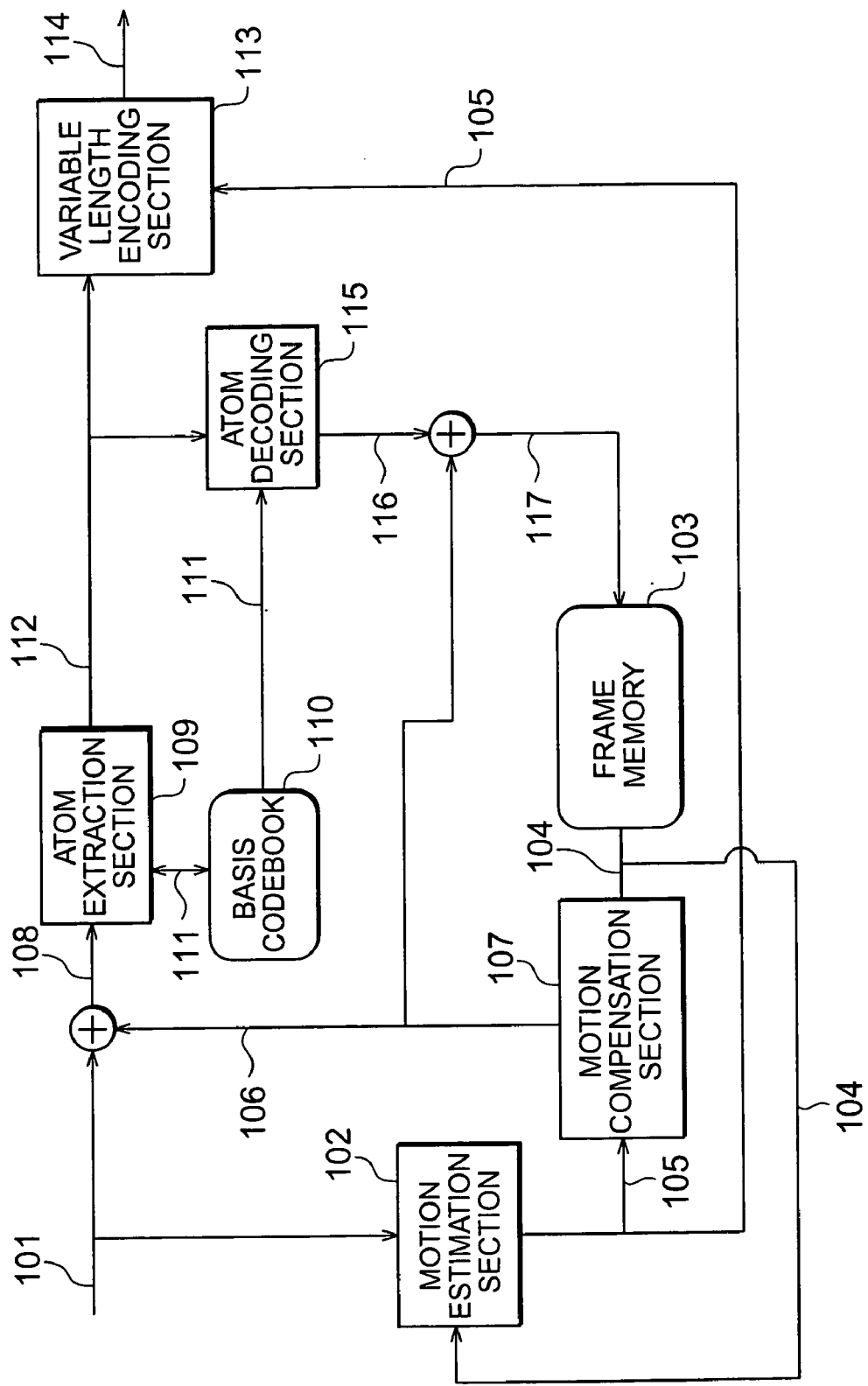
FIG. 1 is a constitutional view of the image coding apparatus according to a first embodiment.

Referring now to FIG. 1, a description will now be provided for the image coding apparatus according to the first embodiment. An input image signal 101 is a temporal array of frame images and embodies the frame image unit signals hereinbelow. A frame is divided into fixed square/rectangular regions of 16 pixels×16 lines (referred to as 'macroblocks' below), the processing detailed below being performed using such units. In other words, the macroblock data of the input image signal 101 is first sent to the motion estimation section 102, whereupon estimation of motion vectors 105 is performed by the motion estimation section 102. A motion vector 105 is estimated by referencing a predetermined search region of a previous encoded frame 104 (referred to below as a 'local decoded image') stored in a frame memory 103, locating a pattern similar to the macroblock to be encoded and thus determining the amount of spatial movement between the pattern and the current macroblock. The motion vectors 105 are represented by means of two-dimensional parallel displacement amounts. A block matching method or other method is generally used as the method of estimating the motion vectors 105. As shown in FIGS. 3A to 3G, the units to which the motion vectors 105 are assigned can be defined by units into which the macroblocks are uniformly divided as a variety of rectangular regions, and identification data indicating which block shape is used may be transmitted as the coding mode data.

For example, in MC (Motion compensation) mode 1 shown in FIG. 3A, in order to make a macroblock itself a motion vector-assigned unit, one motion vector is assigned to the macroblock. On the other hand, in MC mode 2 shown in FIG. 3B, regions produced by dividing the macroblock into lateral halves are motion vector-assigned units, meaning that two motion vectors per macroblock are assigned. Similarly, in MC mode 7 shown in FIG. 3G, 16 motion vectors per macroblock are assigned.

Further, the local decoding image used in the motion estimation is not limited to a previous frame alone. Rather, a future frame can also be used as a result of being encoded and stored in the frame memory in advance. The B frame prediction of the MPEG series, for example, is an equivalent process.

Meanwhile, prediction that employs only previous frames is called P-frame prediction, and a case where closed coding within the frame itself is used without the use of interframe prediction is differentiated by being called I-frame prediction. Although the use of a future frame generates switching of the coding order and in turn an increase in the processing delay, there is the merit that variations in the image content produced between previous and future frames is easily predicted, thus making it possible to effectively reduce temporal redundancy still further.

When the motion vectors 105 are determined, a motion compensation section 107 uses the motion vectors 105 to extract a prediction image 106 from the local decoded image 104 in the frame memory. Although the motion estimation section 102 and the motion compensation section 107 perform processing for each of the macroblocks, the differential signal with respect to the input image signal 101 (the prediction residual signal 108) is obtained by taking the frame as the unit. That is, the motion vectors 105 of individual macroblocks are maintained over the entire frame, whereby the prediction image 106 is constituted as a frame-unit image.

Figure 4A:
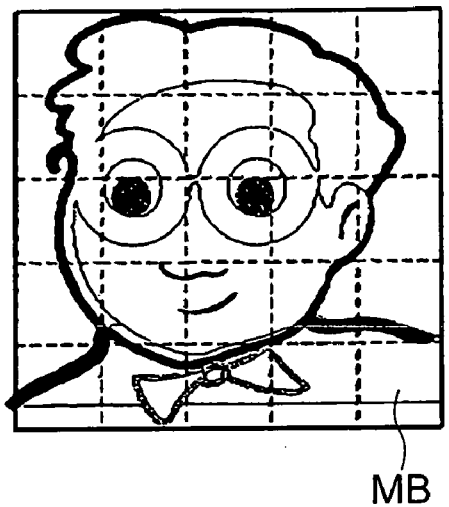
FIGS. 4A and 4B show macroblocks and atoms.
Figure 4B:
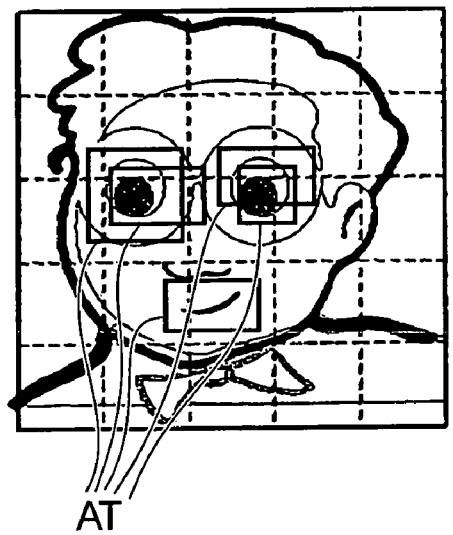

Next, the atom extraction section 109 generates atom parameters 112 on the basis of the above-described Matching Pursuits algorithm, with respect to the prediction residual signal 108. A basis set $g_k$ 111 is stored in a basis codebook 110 and bases that are to be allotted to partial signals are selected from this basis set $g_k$ 111. Atom extraction does not take place within the structure of the macroblocks and is instead performed with the entire frame as the target. This operation is shown in FIGS. 4A and 4B. FIGS. 4A and 4B show that the positions of the atoms are not dependent on the structure of the macroblocks. Here, FIGS. 4A and 4B show prediction residual frames, and the plurality of rectangular regions divided by dotted lines in the figures are macroblocks MB. Further, the center positions of the atoms AT shown in FIG. 4B are represented by the macroblocks in which these center positions are located, and by co-ordinates in the macroblocks. Meanwhile, as the atom coding syntax, a rule that permits transmission in macroblock units is used. Therefore, as can be seen from the equation (1), making use of the fact that the atom coding order does not influence the decoded image, sorting is performed such that the macroblocks are aligned in order using two-dimensional co-ordinates with the top left-hand corner of the frame as the starting point, and the coding order is constructed so that the atoms are counted in macroblock units. The macroblock units are constituted such that atom parameters 112 (the respective basis index, position data, and basis coefficient) are coded in proportion to the number of atoms contained in the macroblock units. Data that indicates how many atoms are contained in a macroblock (the number of atoms in a macroblock) is also encoded. These atom parameters are transmitted and recorded as a compressed stream 114 after entropy coding has been carried out by the variable length encoding section 113.

An atom decoding section 115 decodes a local decoding residual signal 116 from the atom parameters 112 and then obtains a local decoded image 117 by adding the local decoded residual signal 116 to the prediction image 106. The local decoded image 117 is stored in the frame memory 103 to be used in the motion compensation prediction for the next frame.

Figure 2:
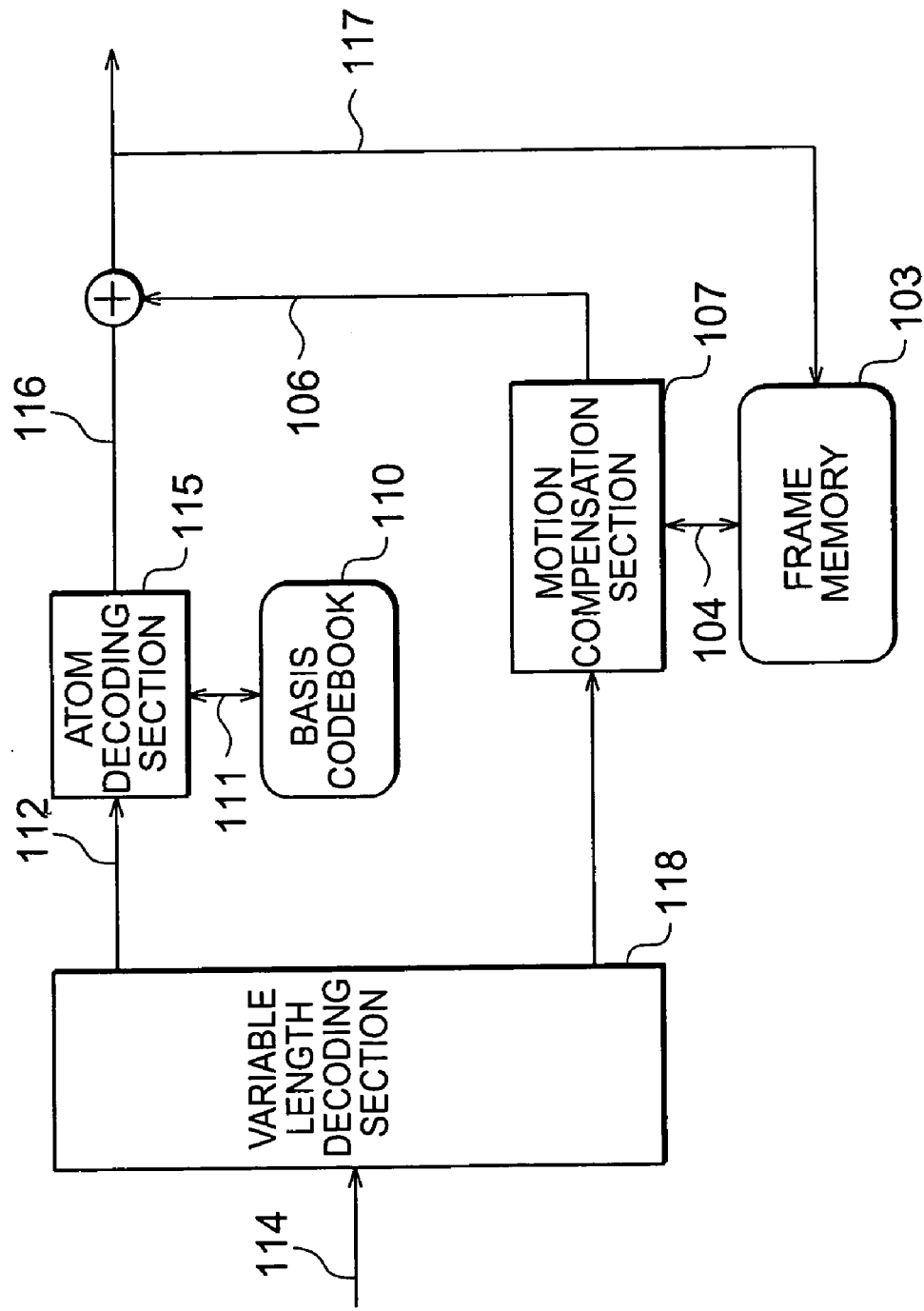
FIG. 2 is a constitutional view of the decoding apparatus according to the first embodiment.

Next, the decoding apparatus according to the first embodiment will be described by referring to FIG. 2. After the compressed stream 114 has been received by the decoding apparatus, a variable length decoding section 118 detects a sync word that represents the start of the frame, whereupon motion vectors 105 and atom parameters 112 are decoded uniquely in macroblock units. The motion vectors 105 are transmitted to the motion compensation section 107 to obtain a prediction image 106. The atom parameters 112 are decoded by the atom decoding section 115. A basis is extracted by supplying a basis index to the basis codebook 110. The output 116 of the atom decoding section 115 is added to the prediction image 106 to produce the decoded image 117. The decoded image 117 is used in the motion compensation prediction for subsequent frames, and is therefore stored in the frame memory 103. The decoding image 117 is outputted to a display device with predetermined display timing, whereby the image is played back.

A description will be provided next for the variable length coding section 113 and the variable length decoding section 118 that are features of the present invention. The variable length coding section 113 and the variable length decoding section 118 use the interdependence of neighboring regions of individual parameters, and the interdependence of parameters, and so forth with respect to the atom parameters obtained in the image coding apparatus shown in FIG. 1, and, by suitably switching the frequency of occurrence table, use the most suitable the frequency of occurrence table in accordance with the circumstances, whereby the coding efficiency of arithmetic coding is improved.

Figure 5:
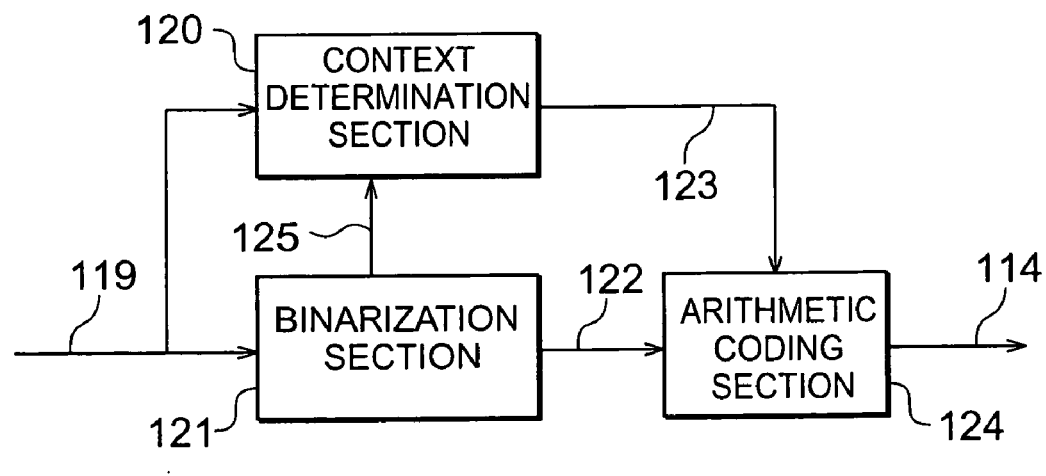
FIG. 5 shows the constitution of a variable length encoding section.

FIG. 5 shows the constitution of the variable length coding section 113. In FIG. 5, an input 119 includes the above-described atom parameters 112 and also coding mode data for the relevant macroblocks. In the first embodiment, the context is defined with respect to the following data in the input 119.

1 Coding mode data
2 Position data
3 Index indicating the basis
4 Number of atoms in a macroblock.

This data is binarized according to a predetermined rule by a binarization section 121 since the frequency of occurrence table be switched in bit units. As a result, frequency of occurrence tables consisting of 0's and 1's are constituted for switching in accordance with bit positions after binarization. The switching of the frequency of occurrence table is performed by the context determination section 120. The context determination section 120 determines the frequency of occurrence table 123 which is suited to the context at that point in time, in accordance with bit positions 125 for encoding which are provided by the binarization section 121, and supplies the appropriate frequency of occurrence table 123 to an arithmetic coding section 124.

A description will be provided next for the context definition for each data item.

(1) Context Corresponding to Coding Mode Data

Coding mode data in the input 119 is data supplied to the decoding apparatus as macroblock coding data, such as data indicating whether relevant macroblocks are encoded by means of any of the motion vector assigned units shown in FIGS. 3A to 3G, or interframe encoded or intraframe encoded, for example. In the first embodiment, the choice of coding modes is established as below, for example.

Coding mode 1: skip
Coding mode 2: MC mode 1 (FIG. 3A), without atoms
Coding mode 3: MC mode 2 (FIG. 3B), without atoms
Coding mode 4: MC mode 3 (FIG. 3C), without atoms
Coding mode 5: MC mode 4 (FIG. 3D), without atoms
Coding mode 6: MC mode 5 (FIG. 3E), without atoms
Coding mode 7: MC mode 6 (FIG. 3F), without atoms
Coding mode 8: MC mode 7 (FIG. 3G), without atoms
Coding mode 9: intra coded, without atoms
Coding mode 10: MC mode 1 (FIG. 3A), with atoms
Coding mode 11: MC mode 2 (FIG. 3B), with atoms
Coding mode 12: MC mode 3 (FIG. 3C), with atoms
Coding mode 13: MC mode 4 (FIG. 3D), with atoms
Coding mode 14: MC mode 5 (FIG. 3E), with atoms
Coding mode 15: MC mode 6 (FIG. 3F), with atoms
Coding mode 16: MC mode 7 (FIG. 3G), with atoms
Coding mode 17: intra coded, with atoms Here, the 'skip' of coding mode 1 signifies a case where the motion vector is zero and atoms are not encoded and corresponds to a mode in which images in positions spatially equal to those of the reference image are copied as is. Coding modes 2 to 8 are for cases where motion vectors corresponding to the individual MC modes in FIGS. 3A to 3G are present but there are no atoms to be encoded as a residual; coding modes 10 to 16 are for cases where motion vectors corresponding to the individual MC modes in FIGS. 3A to 3G are present and there are atoms to be encoded as a residual; coding mode 9 is for a case where intra coding is performed and there are no atoms to be encoded as a residual; and coding mode 17 is for a case where intra coding is performed and there are atoms to be encoded as a residual. Further, here, where intra coding is concerned, encoding of only DC components is assumed, and the assumption is made that AC components are encoded by atoms in the form of a residual.

Figure 6:
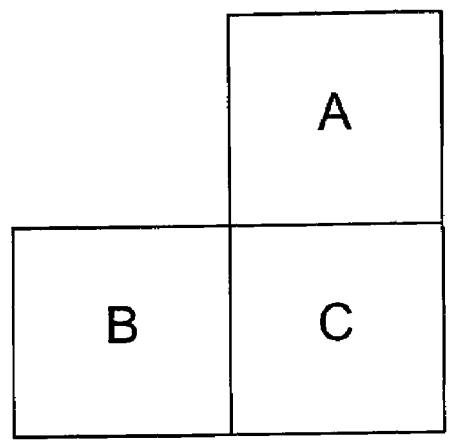
FIG. 6 serves to define the context for the coding mode data of macroblock C.

The context for the coding mode data is defined as shown in FIG. 6. In FIG. 6, A to C represent adjacent macroblocks, and the context for the coding mode data of macroblock C is defined as follows.

$$CM1 = g(A) + 2 \times g(B)$$

Here, $g(X)=0$ (when the coding mode of macroblock X is 'skip')
=1 (at all other times)

$$CM2 = h(A) + 2 \times h(B)$$

Here, $h(X)=0$ (when there are no atoms in macroblock X)
=1 (at all other times)

Here, the context of CM1 is whether or not A or B is in skip mode. For example, when both A and B are in skip mode, CM1=0; when neither A nor B is in skip mode, CM1=3. Due to the properties of the image signal, a difference in the value of CM1 clearly has an influence on the frequency of occurrence of the coding mode data of macroblock C, and therefore an improvement in the efficiency of the arithmetic coding is to be expected by switching the frequency of occurrence table in accordance with the value of CM1. Similarly, the context of CM2 is whether or not A or B comprises atoms to be encoded as a residual. Similarly to CM1, since the frequency with which atoms are present or are not present in macroblock C is changed in accordance with the surrounding conditions, the frequency of occurrence table is switched according to the value of CM2.

The binarization section 121 performs binarization of the coding mode data of coding modes 1 to 17 so that CM1 and CM2 correspond to the first and second bits respectively. The switching of the frequency of occurrence table is thus performed according to bit position. Also, since the above-described context always necessitates data for macroblocks that lie above and to the left, the coding mode data for the current macroblock is buffered in the context determination section 120 for the sake of the context judgment for subsequent macroblocks.

An example of binarization of coding mode data is shown in FIG. 13, a four-type frequency of occurrence table for the first bit is shown in FIG. 14, and a four-type frequency of occurrence table for the second bit is shown in FIG. 15.

A description will be provided below for the arithmetic coding of the coding mode data according to the present invention, using FIGS. 14 and 15. For example, in cases where the coding mode data for both the macroblock A and macroblock B which is adjacent to the macroblock C to be encoded in FIG. 6 is 'skip', the value of CM1 as calculated by the equation above is 0. Here, the probability that the coding mode data of macroblock C will also be 'skip' is considered to be high and therefore, as shown in FIG. 14, operation is such that a frequency of occurrence table corresponding to CM1=0, which is a table for which the probability is high that the first bit following binarization of the coding mode data will be 0 (that is, skip mode is selected) is selected.

Likewise, in cases where the coding mode data for neither macroblock A nor B is in skip mode for example, the value of CM1 as calculated by the equation shown above is 3. In such a case, the probability that the coding mode data of macroblock C will also be 'skip' is considered to be low and therefore, as shown in FIG. 14, operation is such that a frequency of occurrence table corresponding to CM1=3, which is a table for which the probability is low that the first bit following binarization of the coding mode data will be 0, is selected.

Further, similarly in cases where the coding mode data for either of macroblocks A and B is for a mode in which no atoms are present for example, the value of CM2 as calculated by the equation shown above is 0. In such a case, the probability that the coding mode data of macroblock C will also be for a mode in which no atoms are present is considered to be high and therefore, as shown in FIG. 15, operation is such that a frequency of occurrence table corresponding to CM2=0, which is a table for which the probability is high that the second bit following binarization of the coding mode data will be 0 (that is, a mode in which atoms are not present is selected), is selected.

Similarly in cases where the coding mode data for both macroblocks A and B is for a mode in which atoms are present for example, the value of CM2 as calculated by the equation shown above is 3. In such a case, the probability that the coding mode data of macroblock C will be for a mode in which no atoms are present is considered to be low and therefore, as shown in FIG. 15, operation is such that a frequency of occurrence table corresponding to CM2=3, which is a table for which the probability is low that the second bit following binarization of the coding mode data will be 0 (that is, a mode in which atoms are not present is selected), is selected.

(2) Context Corresponding to Position Data

Figure 7A:
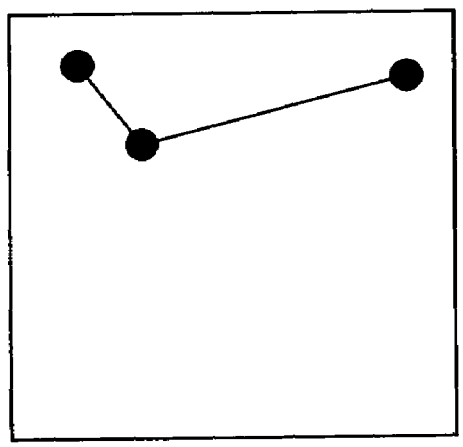
FIGS. 7A and 7B show distributions of position data values.
Figure 7B:
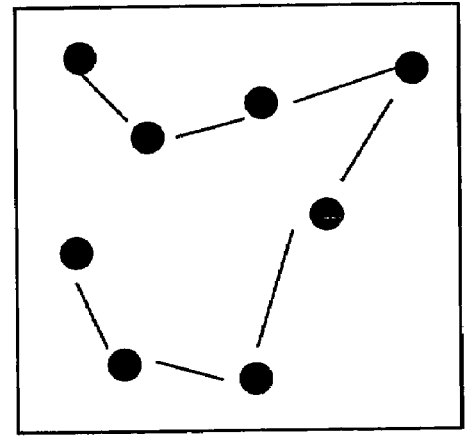

The position data in the input 119 is data that represents the positions of the atoms in the relevant macroblocks as differences. As shown in FIGS. 7A and 7B, the distribution of the values of the position data is largely dependent on the number of atoms in a macroblock. For example, as shown in FIG. 7A, if there are very few atoms in the macroblock, the distance between the atoms is large, and, as shown in FIG. 7B, if there are a lot of atoms, the distance between atoms is inevitably small. In other words, the frequency distribution of the position data is changed in accordance with the value of the number of atoms in the macroblock, and therefore the context is established based on this fact as follows:

CM3=0 (when Na=1)
=1 (when $2 \leqq Na \leqq 4$)
=2 (when $5 \leqq Na \leqq 9$)
=3 (at all other times)

Here, Na indicates the number of atoms in a macroblock. CM3 is a value that serves to designate a given frequency of occurrence table so that when the number of atoms in a macroblock lies within a predetermined range, the frequency distribution of the position data at this time is optimally reflected.

The binarization section 121 performs binarization of the position data so that CM3 can be used in the switching of the frequency of occurrence of the first bit.

An example of binarization of atom position data is shown in FIG. 16, and an example of the four-type frequency of occurrence table for the first bit is shown in FIG. 17.

A description is provided below for the arithmetic coding of atom position data according to the present invention, using FIGS. 16 and 17. For example, for the case where the number of atoms in a macroblock to be encoded is 1, the value of CM3 as calculated by the equation shown above is 0. In such a case, there is a high probability that the position data for the atoms in macroblock C (that is, the distance between atoms) will be a high value, and therefore, as shown in FIG. 17, operation is such that a frequency of occurrence table corresponding to CM3=0, which is a table for which the probability is low that the first bit following binarization of the atom position data will be 0 (that is, the atom position data adopts a value between 0 and 3) is selected.

Similarly, for the case where the number of atoms in a macroblock for macroblock C is 10 for example, the value of CM3 as calculated by the equation shown above is 3. In such a case, there is a high probability that the distance between atoms in macroblock C will be a small value, and therefore, as shown in FIG. 17, operation is such that a frequency of occurrence table corresponding to CM3=3, which is a table for which the probability is high that the first bit following binarization of the atom position data will be 0 (that is, the atom position data adopts a value between 0 and 3) is selected.

(3) Context Corresponding to Basis Index

Figure 8A:
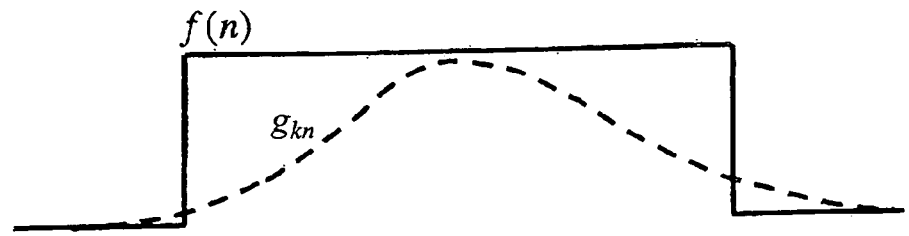
FIGS. 8A and 8B show relationships between the atoms $g_{kn}$ and a residual signal $f(n)$.
Figure 8B:
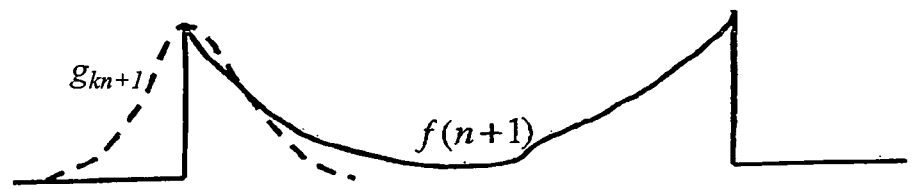

The basis indices in the input 119 are index numbers serving to specify the basis of individual atoms in the relevant macroblocks. As shown in FIG. 8A, when a residual signal that comprises a steep waveform change like a step edge where the power is high is located within an area in the residual signal f (n) of the nth step of atom extraction, there is a high probability that, in subsequent atom extraction steps, a plurality of atoms will be extracted in concentrated fashion in the same location. A residual signal f(n+1) obtained by subtracting the atoms $g_{kn}$ extracted from f(n) exhibits the tendency that the basis size of the atoms extracted in the (n+1)th step and subsequent steps is smaller on account of division into smaller waveforms, as shown in FIG. 8B. Therefore, if a basis codebook is constituted such that if the size of the basis increases, a smaller index number is assigned to the basis, and if the size of the basis decreases, a larger index number is assigned to the basis, there is a tendency, with macroblocks that contain a large number of atoms, for the frequency of occurrence distribution of the atom basis indices to incline towards large values. These facts are utilized to establish the context as follows:

CM4=0 (when Na=1)
=1 (when 2<Na<4)
=2 (when 5<Na<9)
=3 (at all other times)

Here, Na indicates the number of atoms in a macroblock. CM4 is a value that serves to designate a given frequency of occurrence table so that when the number of atoms in a macroblock lies within a predetermined range, the frequency distribution of the basis indices at this time is optimally reflected. The binarization section 121 performs binarization of basis indices so that CM4 can be used in the switching of the frequency of occurrence of the first bit.

An example of binarization of atom basis indices is shown in FIG. 18, and an example of the four-type frequency of occurrence table for the first bit is shown in FIG. 19.

A description is provided below for the arithmetic coding of basis indices according to the present invention, using FIGS. 18 and 19. For example, in cases where the number of atoms in a macroblock of the macroblocks to be encoded is 1, the value of CM4 as calculated by the equation shown above is 0. In such a case, there is a low probability that the basis index for the atoms in macroblock C will be a high value, and therefore, as shown in FIG. 19, operation is such that a frequency of occurrence table corresponding to CM4=0, which is a table for which the probability is high that the first bit following binarization of the basis index will be 0 (that is, the basis index adopts a value between 0 and 3), is selected.

Similarly, in cases where the number of atoms in a macroblock for macroblock C is 10 for example, the value of CM4 as calculated by the equation shown above is 3. In such a case, there is a high probability that the basis index of atoms in macroblock C will be a large value, and therefore, as shown in FIG. 19, operation is such that a frequency of occurrence table corresponding to CM4=3, which is a table for which the probability is low that the first bit following binarization of the basis index will be 0 (that is, the basis index adopts a value between 0 and 3), is selected.

(4) Context Corresponding to the Number of Atoms in a Macroblock

Figure 12:
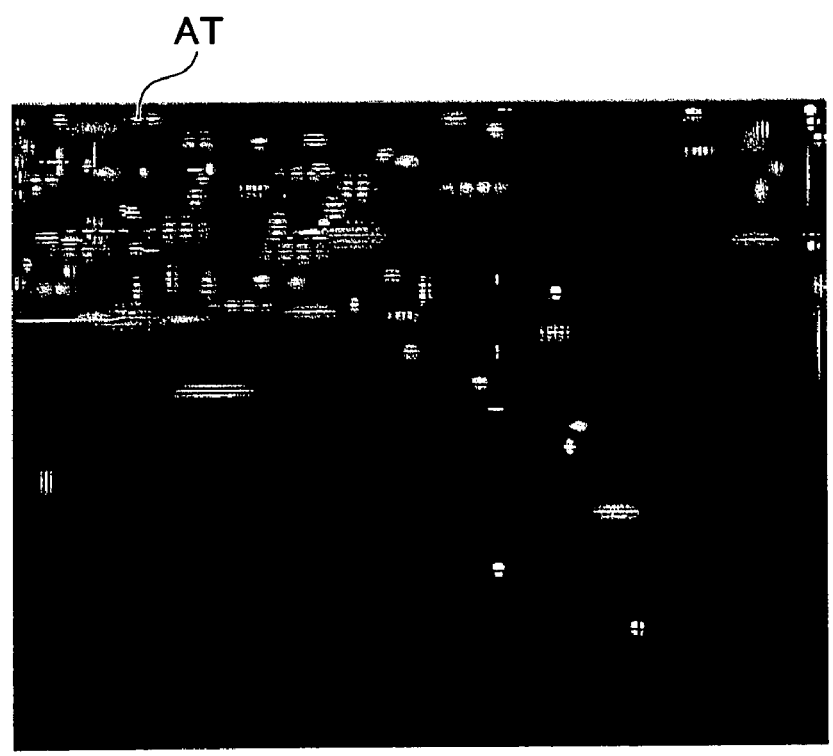
FIG. 12 shows an example of atom distribution.

The number of atoms in a macroblock in the input 119 is the number of atoms Na in the relevant macroblocks. As described above, in FIGS. 8A and 8B, when a residual signal that comprises a steep waveform change like a step edge where the power is high is located within an area in the residual signal f(n) of the nth step of atom extraction, there is a high probability that, in subsequent atom extraction steps, a plurality of atoms will be extracted in concentrated fashion in the same location. Accordingly, if the number of atoms in adjacent macroblocks is high, the probability is high that the number of atoms in the relevant macroblock will also be high. Conversely, when the number of atoms in adjacent macroblocks is low, the probability is high that the number of atoms in the macroblock will also be low. An example of a typical distribution of atoms in the screen is shown in FIG. 12. The white parts in FIG. 12 are atoms AT. Here, as shown in FIG. 6, the adjacent macroblock which lies above the macroblock C is A, and the adjacent macroblock to the left of macroblock C is B, and the numbers of atoms in macroblocks A and B are Na (A) and Na (B) respectively. The context for the number of atoms in a macroblock is established as follows:

CM5=0 (when Na(A)+Na(B)<3)
=1 (when $3 \leq Na(A)+Na(B) \leq 5$)
=2 (when $6 \leq Na(A)+Na(B) \leq 9$)
=3 (at all other times)

CM5 is a value that serves to designate a given frequency of occurrence table so that when the number of atoms in adjacent macroblocks lies within a predetermined range, the frequency distribution of the number of atoms in the relevant macroblocks at this time is optimally reflected. The binarization section 121 performs binarization of the number of atoms in a macroblock so that CM5 can be used in the switching of the frequency of occurrence of the first bit.

An example of binarization of the number of atoms in a macroblock is shown in FIG. 20, and an example of the four-type frequency of occurrence table for the first bit is shown in FIG. 21.

A description is provided below for the arithmetic coding of the number of atoms in a macroblock according to the present invention, using FIGS. 20 and 21. For example, in a case where the total of the numbers of atoms in a macroblock of macroblocks A and B which is adjacent to the macroblock C to be encoded in FIG. 6 is 1, the value of CM5 as calculated by the equation shown above is 0. In such a case, there is a high probability that the number of atoms in a macroblock of macroblock C will be a low, and therefore, as shown in FIG. 21, operation is such that a frequency of occurrence table corresponding to CM5=0, which is a table for which the probability is high that the first bit following binarization of the number of atoms in a macroblock will be 0 (that is, the number of atoms in a macroblock adopts a value between 1 and 2), is selected.

Similarly, in cases where the total of the numbers of atoms in macroblocks A and B is 10 for example, the value of CM5 as calculated by the equation shown above is 3. In such a case, there is a high probability that the number of atoms in a macroblock of macroblock C will be large, and therefore, as shown in FIG. 21, operation is such that a frequency of occurrence table corresponding to CM5=3, which is a table for which the probability is low that the first bit following binarization of the number of atoms in a macroblock will be 0 (that is, the number of atoms in a macroblock adopts a value from 1 to 2), is selected.

Further, in another example, the context for the number of atoms in a macroblock is established as follows.

CM6=0 (when Max $(MVDx^2)$+Max$(MVDy^2)$<10)
=1 (at all other times)

Here, MVDx and MVDy are differential motion vectors whose differential values are the differences between the horizontal component MVx and the vertical component MVy of the motion vectors in the relevant macroblock, and the predicted values PMVx and PMVy respectively for these components. The predicted values PMVx and PMVy employ the median value of the motion vectors in nearby macroblocks for use in coding systems such as MPEG-4, H. 26L, for example. Further, Max(x) signifies processing with respect to the differential motion vector which provides the largest differential motion vector absolute value of all the differential motion vectors x in the macroblock.

The larger the differential motion vectors in the macroblocks become, the more complex the image motion in the macroblocks is, and therefore the power of the residual signal tends to increase. Hence, atoms readily concentrate in these macroblocks. Accordingly, the coding efficiency can be raised by affording CM6 a value that serves to designate a given frequency of occurrence table so that the frequency distribution of the number of atoms in the macroblock is optimally reflected. The binarization section 121 performs binarization of the number of atoms in a macroblock so that CM6 can be used in the switching of the frequency of occurrence of the first bit.

An example of the four-type frequency of occurrence table for the first bit after binarization of the number of atoms in a macroblock is shown in FIG. 22.

Other examples of arithmetic coding of the number of atoms in a macroblock according to the present invention will now be described using FIGS. 20 and 22. For example, in a case where there are four differential motion vectors for a macroblock to be encoded and these vectors are MV1=(0,1), MV2=(2 −1) MV3=(−2,−2), and MV4=(0,0), the value of CM6, which is calculated by applying the equation shown above to MV3 which has the largest absolute value of MV1 to MV4, is 0. In this case, the motion in the macroblock to be encoded is not considered to be complex, and the probability that the number of atoms in the macroblock will be small is high, and therefore, as shown in FIG. 22, operation is such that a frequency of occurrence table corresponding to CM6=0, which is a table for which the probability is high that the first bit following binarization of the number of atoms in the macroblock will be 0 (that is, the number of atoms in the macroblock adopts a value of 1 to 2), is selected.

Similarly, in a case where there are two differential motion vectors for a macroblock to be encoded and these vectorsare MV1=(0,1), and MV2=(3, −2) for example, the value of CM6, which is calculated by applying the equation shown above to MV2 which has the largest absolute value of MV1 and MV2, is 1. In this case, the motion in the macroblock to be encoded is considered to be complex, and the probability that the number of atoms in the macroblock will be large is high, and therefore, as shown in FIG. 22, operation is such that a frequency of occurrence table corresponding to CM6=1, which is a table for which the probability is low that the first bit following binarization of the number of atoms in the macroblock will be 0 (that is, the number of atoms in the macroblock adopts a value of 1 to 2), is selected.

Further, in the first embodiment, examples are illustrated in which specific values are used as threshold values in equations for determining the context. However, the present invention can naturally be applied without being restricted to these specific values.

Figure 9:
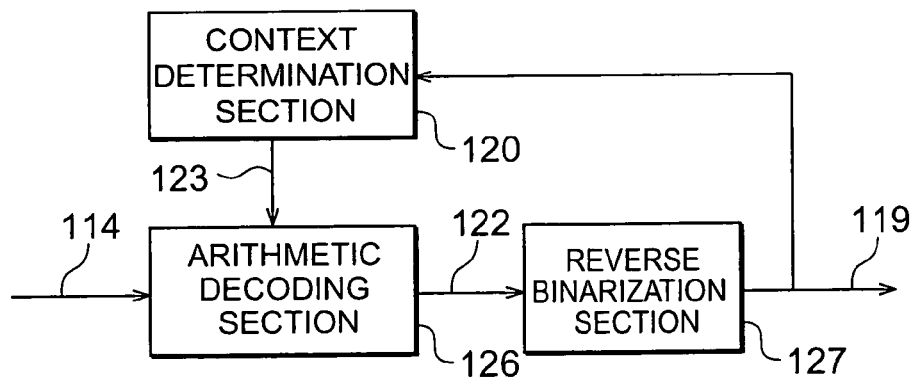
FIG. 9 shows the constitution of a variable length decoding section.

FIG. 9 shows the constitution of the variable length decoding section 118. The variable length decoding section 118 has the compressed stream 114 inputted thereto and, similarly to the variable length coding section 113, the frequency of occurrence table 123 (table definition is the same as that for the variable length coding section 113) is switched in bit units in accordance with the context established by the context determination section 120, and arithmetic decoding into binary data proceeds in the arithmetic decoding section 126. The decoded binary data 122 is converted to final decoded data 119 by a reverse binarization section 127 according to a rule that is the same as that employed on the encoding side. In other words, because entropy coding is employed, a lossless decoded value, which is the same as the input signal 119 inputted to the variable length coding section 113, is obtained. Of the decoded data, the data which will be used in the context determination of the decoding processing for subsequent macroblocks is transmitted to the context determination section 120 and buffered.

Second Embodiment

Figure 10:
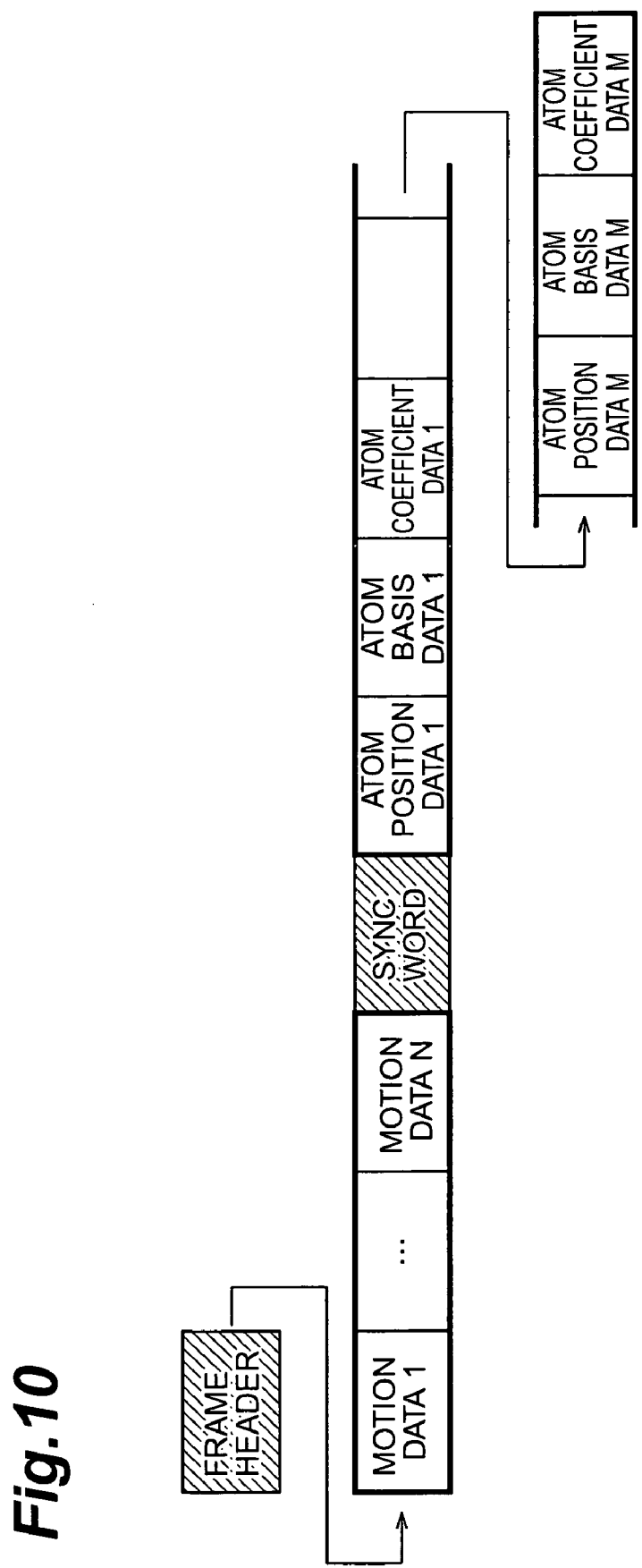
FIG. 10 shows the coding data array (syntax) aspect of a frame unit of a compressed stream.

In the second embodiment, a description is provided for an apparatus for coding/decoding atom parameters in frame units, rather than in the macroblock units employed by the coding/decoding apparatus according to the first embodiment. FIG. 10 shows the coding data array (syntax) aspect of a frame unit of the compressed stream 114. Following on from the frame header which stores the frame time stamp, initial parameters, activity data (details provided hereinafter), and so forth, data relating to the motion, in fixed block units, of macroblocks such as those described in the first embodiment is combined and multiplexed, for example. Here, a counter N is the number of macroblocks in the frame and is generally a constant that is determined uniquely for the image size. A sync word is inserted next. The sync word is required to be a unique code indicating the start of the atom parameters for this frame. The insertion of the sync word enables the decoding apparatus to separate in advance the motion data, which is to be encoded using macroblock units, and the atom parameters which are to be encoded in frame units, to thereby permit parallel processing of the motion data and atom parameters into respective decoding processing blocks, whereby the decoding processing can be accelerated. Further, in the event of a line error or the like, when it has been confirmed that an error is generated which occurs after the sync word, flexibility such that error concealment processing is performed by means of motion data alone can also be ensured. Following the sync word, atom parameters are multiplexed in the order in which same are detected in the frame. Here, the counter M for the atom parameters generally fluctuates for each frame and is not already known. As means for determining the counter M, there are methods which involve embedding the value of counter M in the sync word itself, providing a Terminate code in the position data which is data for the start of the atom parameters, and ending the processing to decode the atom parameters of the frame at the moment when the Terminate code is detected.

Figure 11:
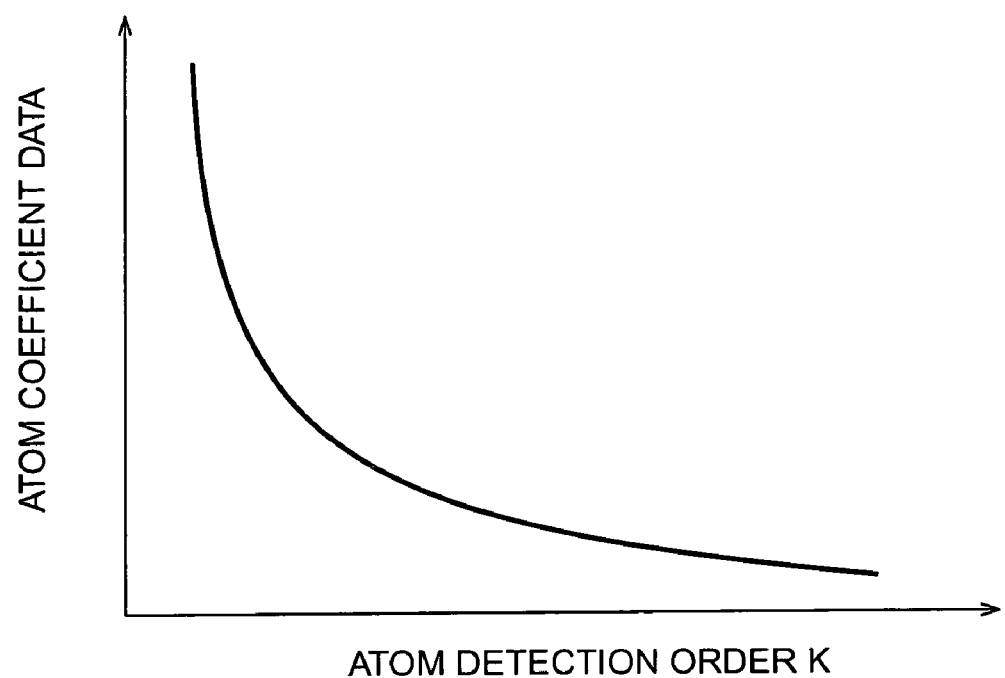
FIG. 11 shows the relationship between the atom detection order K and atom coefficient data.

The atom parameters are encoded in the order in which same are detected in the frame. Subsequently, the basis coefficients for the detected atoms are called the atom coefficient data or the atom coefficients. The atoms are normally encoded in order starting with the significant locations in the image data. Generally, the essential data of the image data resides in the extent of the motion and control is exercised such that this data is extracted in order starting with the locations in which motion is large and the interframe prediction residual power is large. As is shown in FIG. 11, when atoms are detected according to this rule, the atom coefficient data first assume a large value at the start of the detection, but as power is gradually removed by the atoms, there is a tendency for the values of the coefficient data to become smaller each time same are detected. It can therefore be stated that the Kth atom coefficient data has a strong correlation with the previously multiplexed (K−1)th atom coefficient data. Therefore, the Kth atom coefficient is encoded as differential data that represents the difference from the (K−1) th atom coefficient. However, depending on the condition of the interframe prediction residual signal, there are also cases where a plurality of locations having the same power are scattered, and so forth, whereby a deviation from the distribution in FIG. 11 is created.

The constitution is therefore such that activity data for classifying this residual signal distribution is inserted in the frame header, and arithmetic coding is performed by switching the frequency of occurrence table of the atom coefficient data in accordance with this activity data. It is thus possible to perform arithmetic coding which is suited to the atom coefficient distribution that varies for each frame.

Specifically, the variance in the distribution for the power E of the interframe prediction residual signal is for example σ, and classification is carried out using the equation below in accordance with the variance σ

ACT=0 (when σ<TH1)
= 1 (when TH1≦σ≦TH2)
= 2 (at all other times), where ACT is classified activity data and TH1 and TH2 are predetermined threshold values.

Figure 23A:
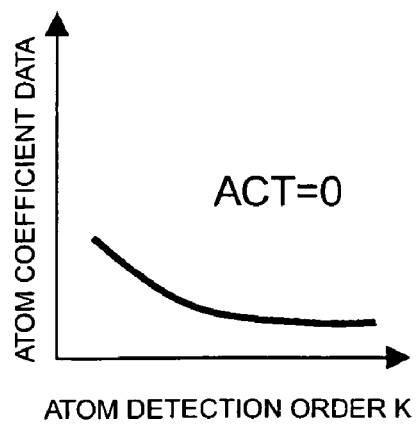
FIGS. 23A to 23C show relationships between the atom detection order K and atom coefficient data, according to the value of ACT.
Figure 23B:
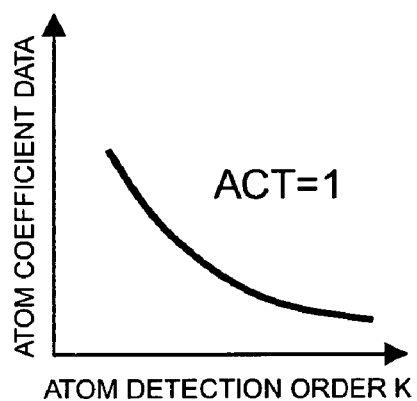
Figure 23C:
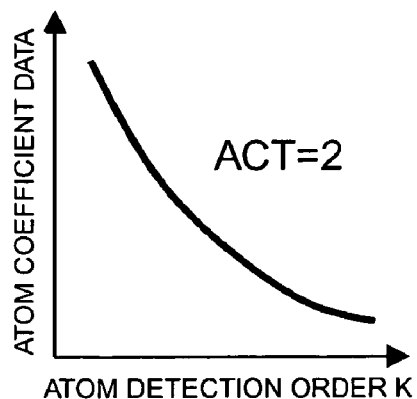

Distributions of typical atom coefficient data for activity data ACT classified thus are exemplified in FIGS. 23A to 23C. Thus, for an increasing value of ACT, the atom coefficient data varies within a broad range from a large value to a small value as the atom detection order K increases. Conversely, for a decreasing value of ACT, the atom coefficient data does not vary over a very broad range even when the atom detection order K changes.

The context of the atom coefficient data is determined by the following equation.

CM7=0 (when K=1)
= 1 (when 2≦K≦10)
= 2 (at all other times), where K is the atom detection order. The Kth atom coefficient data is encoded as differential data that represents the difference between the (K−1)th atom coefficient and the Kth atom coefficient as described above. As shown in FIG. 23, there is a tendency for the differential data to become smaller as the value of K increases.

A description is provided below using FIGS. 24 and 25 of an example of the arithmetic coding of atom coefficient data according to the present invention. First, the activity data ACT is computed by means of an interframe prediction residual signal generated by the motion compensation section 107. For example, in a case where the screen movement is not very complex and the power distribution of the interframe prediction residual signal is not very scattered, the variance σ is a small value and the value of ACT is 0. In this case, there is no dependence on the atom detection order K and the atom coefficients do not change very much and therefore, as shown in FIG. 25, operation is such that a table set is selected for ACT=0 which is a table set for which the probability that the first bit after binarization of the atom coefficient data will be 0 (that is, that the atom coefficient data will adopt a value from 0 to 3) is relatively high for CM7.

Conversely, in a case where, for example, the screen movement is complex and the distribution of the power of the interframe prediction residual signal is scattered widely, the variance a is a large value, and the value of ACT is for example 2. In this case, the atom coefficients change considerably, and therefore, as shown in FIG. 25, operation is such that a table set is selected for ACT=2 which is a table set for which the probability that the first bit after binarization of the atom coefficient data will be 0 (that is, that the atom coefficient data will adopt a value from 0 to 3) is relatively low for CM7.

Next, the value of CM7 is computed by means of the above equation in accordance with respective detection orders K. For example, the detection order K=1 for atoms first detected and therefore the value of CM7 is 0. In this case, operation is such that a frequency of occurrence table that corresponds to CM7=0 is selected from a table set selected beforehand in accordance with the Act value. Further, the detection order K=10 for atoms that are detected the tenth time around for example and therefore the value of CM7 is 2. In this case, operation is such that a frequency of occurrence table that corresponds to CM7=2 is selected from a table set selected beforehand in accordance with the ACT value.

According to the constitution described hereinabove, frequency of occurrence tables used in arithmetic coding of atom coefficient data can be suitably selected in accordance with motion data for the entire image and with the atom detection order, and therefore the coding efficiency can be improved. Further, decoding can be correctly performed on the decoding side by decoding the above-described activity data which is contained in the frame header of the compressed stream encoded by the coding method described above, and then selecting a table set using a method like that adopted on the encoding side in accordance with the decoded activity data. Further, decoding can be correctly performed by selecting, when decoding atom coefficients, a frequency of occurrence table by means of a method like that used on the encoding side in accordance with the number of atoms in previously decoded macroblocks.

INDUSTRIAL APPLICABILITY

The present invention can be used as a moving image encoding apparatus or decoding apparatus.

The invention claimed is:

1. An image coding apparatus comprising:
 position data acquiring means for acquiring position data indicating the positions of unit elements of prediction residual data in predetermined partial image regions, for each of the partial image regions;
 context determining means for determining the frequency of occurrence distribution of the position data in the partial image regions to be encoded, in accordance with the number of unit elements of prediction residual data which are present in the partial image regions; and
 reversible encoding means for performing arithmetic coding of the position data on the basis of the determined frequency of occurrence distribution.

2. The image coding apparatus as defined in claim 1, further comprising:
 binarization means for representing types of the position data in binarized form,
 wherein the context determining means determine a specified frequency of occurrence distribution from among a plurality of frequency of occurrence distributions in accordance with the bit positions of the binarized data.

3. An image decoding apparatus comprising:
 reversible decoding means for decoding position data indicating the positions of unit elements of prediction residual data in predetermined partial image regions, for each of the partial image regions;
 context determining means for determining the frequency of occurrence distribution of the position data in the partial image regions to be decoded, in accordance with the number of unit elements of prediction residual data which are present in the partial image regions; and
 arithmetic decoding means for performing arithmetic decoding of the position data on the basis of the determined frequency of occurrence distribution.

4. The image decoding apparatus as defined in claim 3, further comprising:
 reverse binarization means for converting a bit stream outputted by the arithmetic decoding means to data reflecting the position data, according to a pre-established rule,
 wherein the context determining means determine a specified frequency of occurrence distribution from among a plurality of frequency of occurrence distributions in accordance with the bit positions processed by means of the arithmetic decoding means.

5. An image coding method comprising:
- a position data acquiring step of acquiring position data indicating the positions of unit elements of prediction residual data in predetermined partial image regions, for each of the partial image regions;
- a context determining step of determining the frequency of occurrence distribution of the position data in the partial image regions to be encoded, in accordance with the number of unit elements of prediction residual data which are present in the partial image regions; and
- a reversible encoding step of performing arithmetic coding of the position on the basis of the determined frequency of occurrence distribution.

6. The image coding method as defined in claim 5, further comprising:
- a binarization step of representing types of the position data in binarized form,
- wherein the context determining step determines a specified frequency of occurrence distribution from among a plurality of frequency of occurrence distributions in accordance with the bit positions of the binarized data.

7. An image decoding method comprising:
- a reversible decoding step of decoding position data indicating the positions of unit elements of prediction residual data in predetermined partial image regions, for each of the partial image regions;
- a context determining step of determining the frequency of occurrence distribution of the position data in the partial image regions to be decoded, in accordance with the number of unit elements of prediction residual data which are present in the partial image regions; and
- an arithmetic decoding step of performing arithmetic decoding of the position data on the basis of the determined frequency of occurrence distribution.

8. The image decoding method as defined in claim 7, further comprising:
- a reverse binarization step of converting a bit stream outputted by the arithmetic decoding step to data reflecting the position data, according to a pre-established rule,
- wherein the context determining step determines a specified frequency of occurrence distribution from among a plurality of frequency of occurrence distributions in accordance with the bit positions processed in the arithmetic decoding step.

9. An image decoding apparatus, comprising:
- context determining means for determining the frequency of occurrence distribution of the basis coefficient data of the partial image regions to be decoded, in accordance with the decoding order of basis coefficient data used in the representation of the unit elements of prediction residual data in predetermined partial image regions; and
- arithmetic decoding means for performing arithmetic decoding of the basis coefficient data on the basis of the determined frequency of occurrence distribution.

10. The image decoding apparatus as defined in claim 9, further comprising:
- reverse binarization means for converting a bit stream outputted by the arithmetic decoding means to data reflecting the basis coefficient data, according to a pre-established rule,
- wherein the context determining means determine a specified frequency of occurrence distribution from among a plurality of frequency of occurrence distributions in accordance with the bit positions processed by means of the arithmetic decoding means.

11. An image decoding method, comprising:
- a context determining step of determining the frequency of occurrence distribution of the basis coefficient data of the partial image regions to be decoded, in accordance with the decoding order of basis coefficient data used in the representation of the unit elements of prediction residual data in predetermined partial image regions; and
- an arithmetic decoding step of performing arithmetic decoding of the basis coefficient data on the basis of the determined frequency of occurrence distribution.

12. The image decoding method as defined in claim 11, further comprising:
- a reverse binarization step of converting a bit stream outputted by the arithmetic decoding step to data reflecting the basis coefficient data, according to a pre-established rule,
- wherein the context determining step determines a specified frequency of occurrence distribution from among a plurality of frequency of occurrence distributions in accordance with the bit positions processed by means of the arithmetic decoding step.

* * * * *